United States Patent [19]

Seregely

[11] 4,339,864
[45] Jul. 20, 1982

[54] METHOD OF FORMING INTERLOCKING PIPE JOINT

[76] Inventor: Daniel W. Seregely, P.O. Box 2021, Santa Monica, Calif. 90406

[21] Appl. No.: 89,632

[22] Filed: Oct. 29, 1979

[51] Int. Cl.³ .................... B23P 11/02; B29C 19/00
[52] U.S. Cl. ........................................ 29/450; 29/453; 29/460; 29/522 R; 46/28; 46/29; 264/146; 264/249; 264/263; 403/347; 411/34
[58] Field of Search ............... 29/450, 451, 453, 525, 29/509, 522 R, 460; 46/16, 28, 29; 403/347, 346; 411/3, 9, 8, 34, 38, 514, 513; 264/146, 263, 249

[56] References Cited

U.S. PATENT DOCUMENTS

| | | | |
|---|---|---|---|
| 548,998 | 10/1895 | Mannesmann | 403/346 X |
| 1,011,151 | 12/1911 | Brown | 411/34 |
| 2,653,334 | 9/1953 | Bay | 411/38 X |
| 2,927,953 | 3/1960 | Staller | 29/454 UX |
| 3,397,699 | 8/1968 | Kohl | 29/450 UX |
| 3,469,339 | 9/1969 | Thomas | 46/29 X |
| 3,497,245 | 2/1970 | Metzger | 403/347 X |
| 4,116,106 | 9/1978 | Barbour | 411/38 |
| 4,274,222 | 6/1981 | Zahn et al. | 46/29 |

FOREIGN PATENT DOCUMENTS

| | | | |
|---|---|---|---|
| 705424 | 3/1931 | France | 403/347 |
| 1278641 | 11/1961 | France | 411/38 |
| 776249 | 6/1957 | United Kingdom | 411/38 |

Primary Examiner—Charlie T. Moon
Attorney, Agent, or Firm—Poms, Smith, Lande & Rose

[57] ABSTRACT

A construction set of resiliently flexible pipe incorporating an integrally formed interlocking pipe joint. The set and joint are adaptable for use on a small scale as a toy and on a larger scale for construction of furniture, geodesic domes, and the like. Outwardly bowed longitudinal members integrally formed in the pipes are adapted to be inserted with the members of one pipe interlocked with the members of the other pipe. In alternate embodiments, a spherical member or hardenable material are inserted within the assembled joint.

4 Claims, 12 Drawing Figures

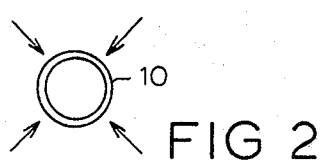
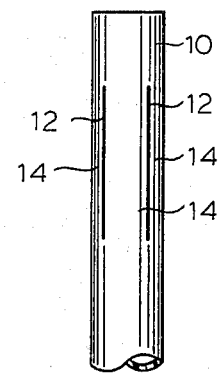
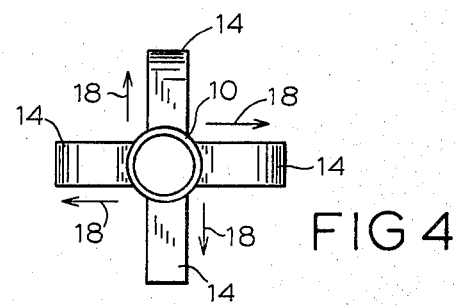
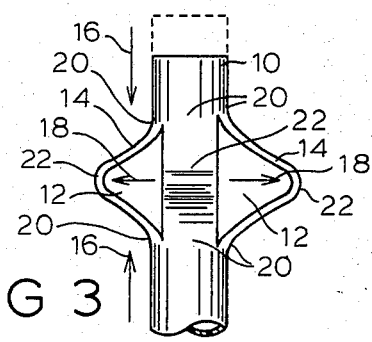
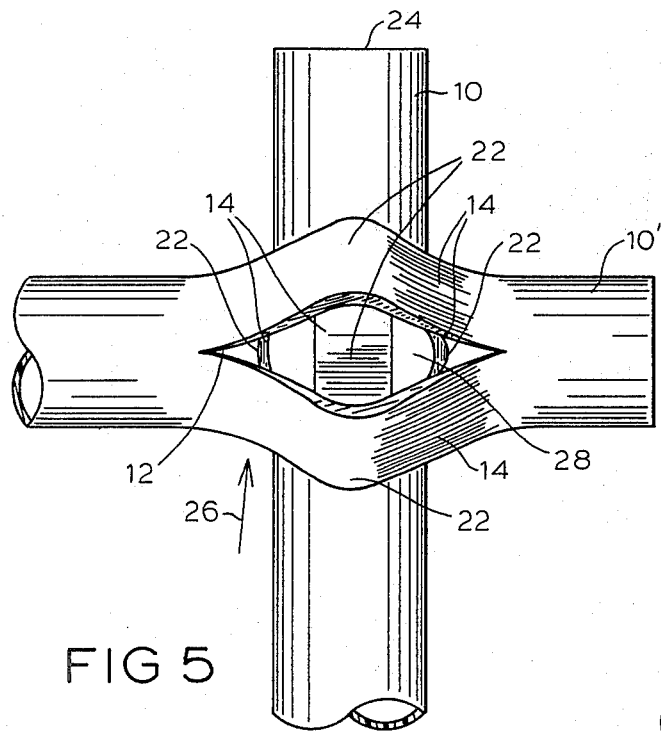
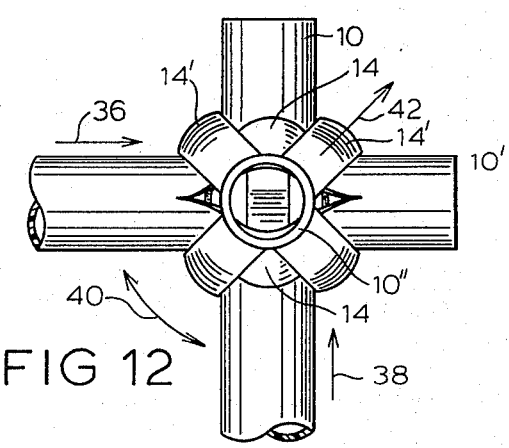

METHOD OF FORMING INTERLOCKING PIPE JOINT

BACKGROUND OF THE INVENTION

The present invention relates to construction sets and, more particularly, to construction sets employing resiliently flexible tubing.

Various construction sets are well known and available. For example, the well known Erector brand construction set employs various shaped metal members having holes therein adapted for interconnection by the use of standard nuts and bolts.

Another well-known children's construction set is sold under the name of Leggo blocks. These are generally rectangular plastic members having cylindrical projections on one surface and an opposite surface adapted to interlock with the cylindrical projections. The blocks can be stacked in overlapped relationships by interlocking the surfaces together.

Yet another type of construction set employs lengths of plastic tubing such as polyethylene, in conjunction with separate joining members having cylindrical projections adapted for tight mating with the internal diameter of the pipe segments.

Construction sets employing long members of either bar shape or tubular shape typically employ separate joining members at the ends. Since the joining members are quite small in comparison to the long members, they usually get lost or misplaced particularly where younger children are involved. With the loss of the joining members, the construction set becomes virtually useless.

Wherefore, it is the object of the present invention to provide for an integrally formed joint in tubular construction members to be employed in construction sets and the like.

SUMMARY

The foregoing objectives have been met by the construction set to be described hereinafter employing the method of joining two like cylindrical tubes of resiliently flexible material at substantially right angles comprising the steps of longitudinally slitting each of the two tubes at the intended point of joining at intervals about the circumference thereof for a length of between two and four times the diameter of the tube to form a plurality of longitudinal members from the sidewalls of the each of the tubes; bowing the longitudinal members of each of the tubes outwardly at right angles to the longitudinal axis of the tube to a point where the centers of adjacent ones of the longitudinal members are spaced a distance substantially equal to the diameter of the tube; inserting the end of one of the tubes between a first two of the longitudinal members of the other tube normal to the longitudinal axis thereof; passing the one of the tubes through the other of the tubes to emerge from between the other two of the longitudinal members of the other tube; continuing to pass the one of the tubes through the other tube between the longitudinal members thereof until the longitudinal members of the one tube are adjacent the first two of the longitudinal members of the other tube; and, urging the longitudinal members of the one tube through the space between the first two of the longitudinal members of the other tube into bowed engagement with the interior space formed in the other tube by the longitudinal members thereof.

In one embodiment, the longitudinal members are about twice the diameter of the tube and the step of bowing the longitudinal members is accomplished by pushing the tube portions on each side of the longitudinal members towards one another along the longitudinal axis of the tube to a point where the resiliency of the longitudinal members is exceeded at the ends and center thereof to create a permanent outward peaked portion in each of the longitudinal members.

In another embodiment, the longitudinal members are about four times the diameter of the tube and following the bowing step and prior to the inserting step, a spherical member such as a standard marble of a diameter about twice the diameter of the tube is inserted into the interior space formed in the one tube by the longitudinal members thereof. Such construction provides for a joint which is not only interlocked but, additionally, rotatable within a given degree of freedom.

For more permanent construction, once interlocked, the joint can be permanently locked together by the injection within the interior spaces of a hardening fluid such as polyurethane foam.

DESCRIPTION OF THE DRAWINGS

FIG. 1 is a picture of of a tube slit for the forming of a joint according to a first embodiment of the present invention.

FIG. 2 is an end view of the tube of FIG. 1 indicating the points of slitting about the circumference thereof.

FIG. 3 is a drawing of the tube of FIG. 1 showing the preferred method of outwardly bowing the longitudinal members which form the joint.

FIG. 4 is an end view of the tube of FIG. 3 showing the outward movement of the longitudinal members during the forming thereof.

FIG. 5 shows two tubes having the joint of the present invention according to the embodiment of FIG. 3 in interlocked relationship.

FIG. 12 shows three tubes interlocked according to the present invention.

DESCRIPTION OF THE PREFERRED AND ALTERNATE EMBODIMENTS

Figure 6:
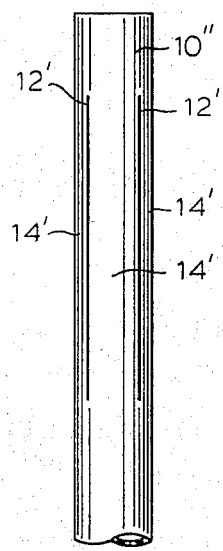
FIG. 6 shows a tube slit in preparation of forming a joint according to the present invention in a second embodiment thereof.

The preferred embodiment of the joint of the present invention and method of forming it are shown with respect to FIGS. 1 through 4. While the drawings and descriptions which follow hereinafter show four longitudinal members, it is to be understood that other numbers can be employed as is practical with the sizes and materials of the tubes. Likewise, while 90° is used as the circumferential portion of each longitudinal member, this is with four members as preferred. For other numbers of members on a tube this distance would be more or less. Likewise, the members need not all be of equal width even though preferred.

As shown in FIGS. 1 and 2, at the point of joining, as for example adjacent the end of a tube 10 of a resiliently flexible material such as plastic, the sidewalls are slit completely through at four points, as indicated by the lines 12, for a length of about twice the diameter of the tube. The slits are equally distant about the circumference. Thus, the slits are 90° apart and, correspondingly, the four longitudinal members 14 formed in the tube by the foregoing slitting each cover 90° of circumference. The longitudinal members 14 are formed into their preferred shape in the manner shown by FIG. 3. The portions of the tube 10 on either side of the longitudinal members 14 are pushed towards one-another as indicated by the arrows 16. In so doing, the longitudinal members 14 are forced outward at right angles to the longitudinal axis of the tube as indicated by the arrows 18. If the plastic of tube 10 is a resiliently flexible plastic and in compressing the two portions of tube 10 towards one another the resiliency of the plastic is exceeded at the ends 20 and middle 22 of longitudinal members 14, these points 20, 22 will take a permanent set upon release of the compressing force on tube 10, to remain substantially as shown in FIG. 3. That is, the longitudinal members 14 will be permanently peaked outwardly at the center thereof.

Two tubes 10 and 10' employing the integrally formed joint of FIG. 3 can be interlocked to the position as shown in FIG. 5. To do so, the end 24 of tube 10 is inserted between two of the longitudinal members 14 of tube 10' as, for example, the bottom member as FIG. 5 is viewed and the one directly behind it on the bottom as FIG. 5 is viewed. Tube 10 is then pushed through the tube 10' in the direction of arrow 26 to emerge from between the opposite two longitudinal members 14 being, in this case, the top member 14 seen as FIG. 5 is viewed and the top member (not seen) directly behind it. As tube 10 is continued to be pushed through tube 10', the longitudinal members 14 of tube 10 come into abutment with the bottom longitudinal members 14 of tube 10'. The longitudinal members 14, being resiliently flexible, are then urged (as by pushing and squeezing) through the space between the lower longitudinal members 14 of tube 10' to spring into bowed engagement with the internal area 28 defined by the longitudinal members 14 of tube 10' in the manner shown in FIG. 5. In particular, the peaked middles 22 spring into engagement with the widened slits 12 of tube 10' to more positively lock the joint together in the manner shown. While generally a 90' angle of joining is thus affected, this joint will have several degrees of freedom of movement determined by the length of the slots 12.

Turning now to FIGS. 6 through 10, an alternate embodiment of the construction set and joint of the present invention is shown. In FIG. 6, the tube 10" is slit, as indicated by lines 12', for a length of about four times the diameter of the tube 10". This embodiment is preferably accomplished with a tube 10" of a softer plastic (such as polyethylene) whereas the preceding and preferred embodiment works better with a plastic of slightly higher resiliency (such as polyvinylchloride).

Figure 7:
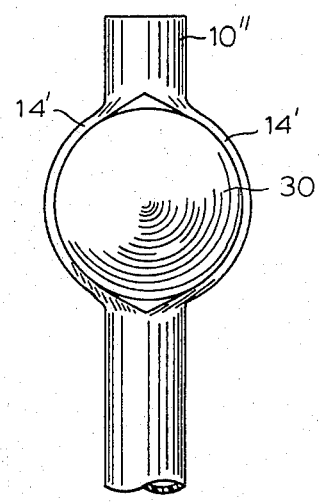
FIG. 7 shows the tube of FIG. 6 in the process of inserting a sphere between the longitudinal members thereof.
Figure 8:
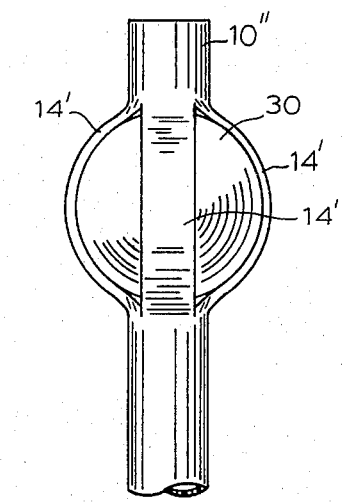
FIG. 8 shows the sphere of FIG. 7 disposed within the space formed by the longitudinal members of the tube of FIG. 6.
Figure 9:
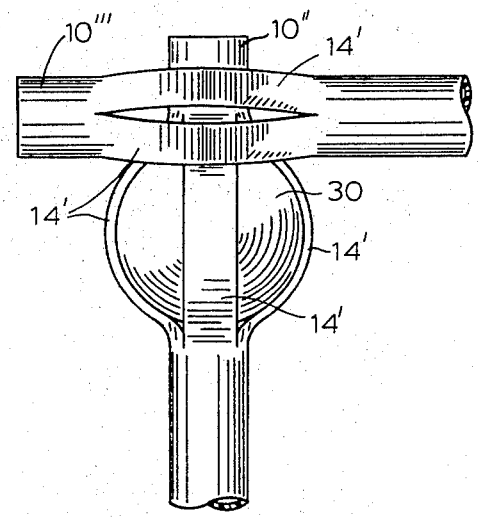
FIG. 9 shows the insertion of the tube and sphere of FIG. 8 into a like joint in a second tube.
Figure 10:
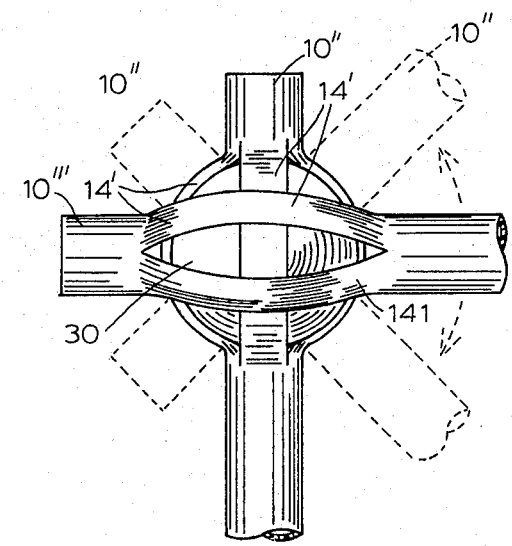
FIG. 10 shows two tubes according to the second embodiment with a sphere disposed therewithin in interlocked relationship.

Turning now to FIG. 7, a spherical member 30 is shown being inserted between the longitudinal members 14'. In a tested embodiment of the present invention, soft polyethylene tubing of approximately ½ inch outside diameter is conveniently employed with a standard child's marble as the spherical member 30. While the joint does, therefore, use an extra piece of apparatus, the extra piece is a standard item which is easily replaceable. As shown in FIG. 7, the spherical member (marble) 30 can be forced between the longitudinal members 14' with two members 14' on either side until the member 30 is positioned with members 14' disposed substantially circumferentially about the middle thereof. At that point, the paired longitudinal members 14' on either side of the spherical member 30 can be rotated apart from one another to place the longitudinal members 14' at 90° intervals about the spherical member 30 as shown in FIG. 8. Thereafter, the tube 10" containing spherical member 30 can be inserted into a like joint in a second tube 10''' substantially in the manner described with respect to the interlocking of two tubes as shown in FIG. 5. This is shown diagrammatically in FIGS. 9 and 10. That is, the tube 10" can be inserted between pairs of the longitudinal members 14' of the second tube 10" and the longitudinal members 14' thereof urged about the longitudinal members 14' of the tube 10' and the spherical members 30 in the same manner that the longitudinal members 14' were urged about the spherical member 30 as shown in FIGS. 7 and 8. When finally assembled, the joint appears as shown in FIG. 10. Because of the added length of longitudinal members 14 and the ball shape of the resultant joint, it can be seen that the resultant joint has a larger given degree of freedom of rotation as compared to the preferred embodiment as indicated by the ghosted positions of FIG. 10. This feature is particularly useful when three tubes are brought together in a single joint (as will be hereinafter described) such as in the construction of geodesic domes.

Figure 11:
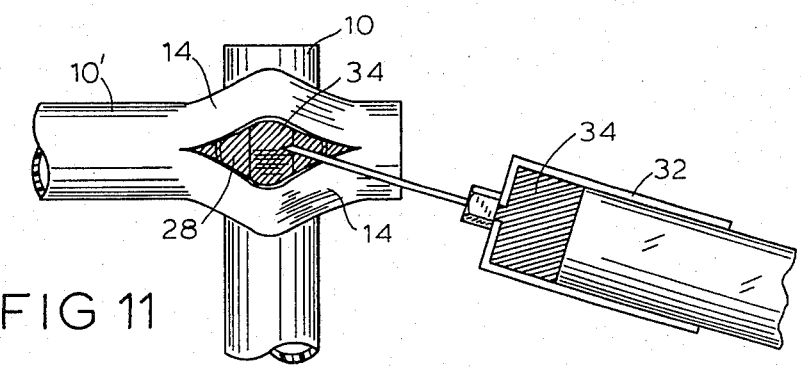
FIG. 11 shows the interlocked tube joint of FIG. 5 being made permanent by the injection of a hardenable fluid within the space defined by the interlocked longitudinal members of the two tubes.

In employing the construction set and joint of the present invention in permanent construction such as furniture, buildings, and the like, permanence can be added by the method shown in FIG. 11. Having assembled a joint in the manner of FIG. 5, a hypodermic needle 32, or the like, can be used to inject a hardenable fluid 34 into the internal area 28 defined by the interlocked longitudinal members 14. In particular, for larger and more expensive type constructions, hardenable polyurethene foam will expand not only to completely fill the area 28, but expand through the slits 12 as well. The joint can thereafter be smoothed as by sanding and/or grinding.

Many times within a construction, it is desirable to bring three members together into a common joint. By combining elements of both the embodiments hereinbefore described, this can be accomplished as shown in FIG. 12. In FIG. 12, the tubes 10 and 10' of FIG. 5 have a tube 10" of the type shown in FIG. 6 for employment with spherical member 30 disposed as the outer member of the joint. For this triple tube joint, the longitudinal members 14' of tube 10" need only be about three times the diameter of the tube inasmuch as the interlocked longitudinal members 14 disposed within longitudinal members 14' are smaller than the spherical member 30. To assemble the three tube joint of FIG. 12, tube 10' is first inserted within tube 10" as indicated by the arrow 36. Thereafter, tube 10 is inserted between both tube 10' and tube 10" as indicated by the arrow 38. That is, the innermost tube 10 is the last to be positioned. For right angle construction, the three interlocked tubes 10, 10', 10" can remain as shown in FIG. 12. For the construction of geodesic domes, there is sufficient give in the preferred joint in FIG. 5 that tubes 10 and 10' can be displaced to a position greater than a right angle as indicated by the arrow 40 and, additionally, tube 10' can be rotated in the direction of arrow 42 because of the flexibility of the joint section of tube 10" as previously described with respect to FIG. 10. Such a triple joint can also be permanently fixed as described with respect to FIG. 11.

Wherefore, it can be seen that the integral joint of the present invention provides for a method of interconnecting tubes which is applicable both to toy construction sets as well as larger commercial scale construction of furniture, buildings, and the like.

Having thus described my invention, I claim:

1. The method of joining two like cylindrical tubes of resiliently flexible material at substantially right angles comprising the steps of:
   (a) forming longitudinal members from the sidewalls of each of the tubes at substantially 90° intervals at the intended point of joining about the circumference thereof for a length of between two and four times the diameter of the tubes;
   (b) bowing said longitudinal members of each of the tubes outwardly at right angles to the longitudinal axis of the tube to a point where the centers of adjacent ones of said longitudinal members are spaced at a distance substantially equal to the diameter of the tubes;
   (c) inserting the end of one of the tubes between a first two of said longitudinal members of the other tube normal to the longitudinal axis thereof;
   (d) passing said one of the tubes through said other of the tubes to emerge from between the other two of said longitudinal members of said other tube;
   (e) continuing to pass said one of the tubes through said other tube between said longitudinal members thereof until said longitudinal members of said one tube are adjacent said longitudinal members of said other tube; and
   (f) urging said longitudinal members of said one tube through the space between said first two of said longitudinal members of said other tube into bowed engagement with the interior space formed in said other tube by said longitudinal members thereof.

2. The joining method of claim 1 wherein:
   said step (b) of bowing said longitudinal members is accomplished by pushing the tube portions on each side of said longitudinal members towards one another along the longitudinal axis of the tube to a point where the resiliency of said longitudinal members is exceeded at the ends and center thereof to create a permanent outward peaked portion in each of said longitudinal members.

3. The joining method of claim 1 and additionally including the step of:
   following said bowing step (b) and prior to said inserting step (c), urging a substantially spherical member of a greater diameter than the diameter of said one tube between two of said longitudinal members of said one tube into the interior space formed in said one tube by said longitudinal members thereof.

4. The joining method of claim 1 and following said urging step (f) additionally including the steps of:
   (g) injecting a hardenable fluid into the space defined by said engaged bowed longitudinal members; and,
   (h) maintaining said fluid in said space until said fluid is hardened there whereby the joint between the tubes is permanently fixed.

* * * * *